March 12, 1957 L. COOPER 2,785,004
COLLAPSIBLE WINDOW FOR FLEXIBLE PANELS
Filed Oct. 14, 1954 3 Sheets-Sheet 1
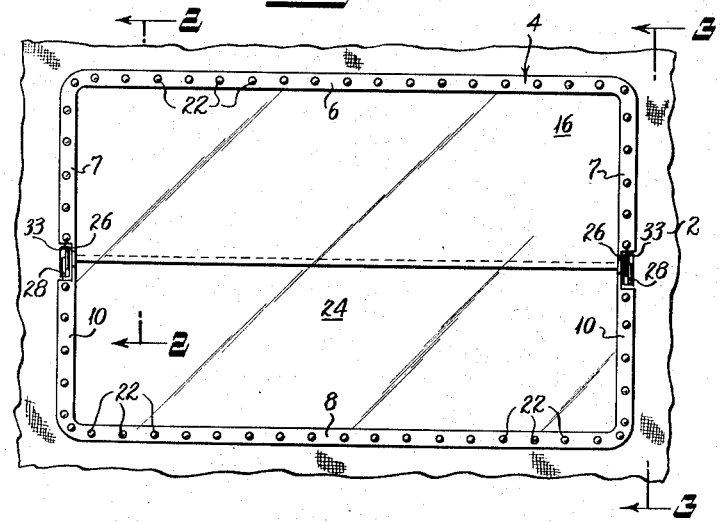
INVENTOR
LEON COOPER
BY Bacon + Thomas
ATTORNEYS March 12, 1957 L. COOPER 2,785,004
COLLAPSIBLE WINDOW FOR FLEXIBLE PANELS
Filed Oct. 14, 1954 3 Sheets-Sheet 2
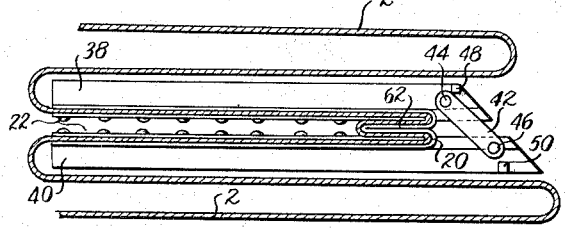
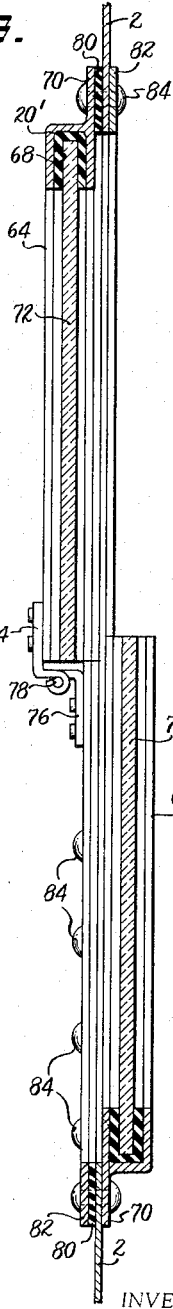
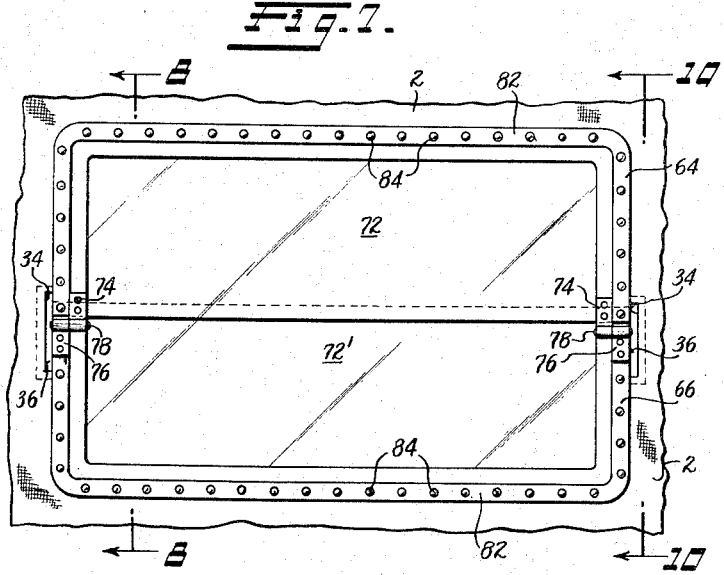
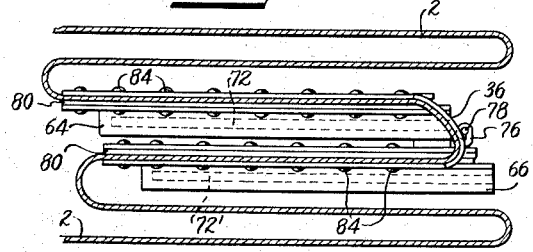
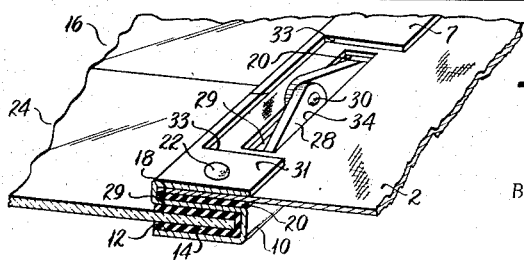
INVENTOR
LEON COOPER
BY
Bacon & Thomas
ATTORNEYS

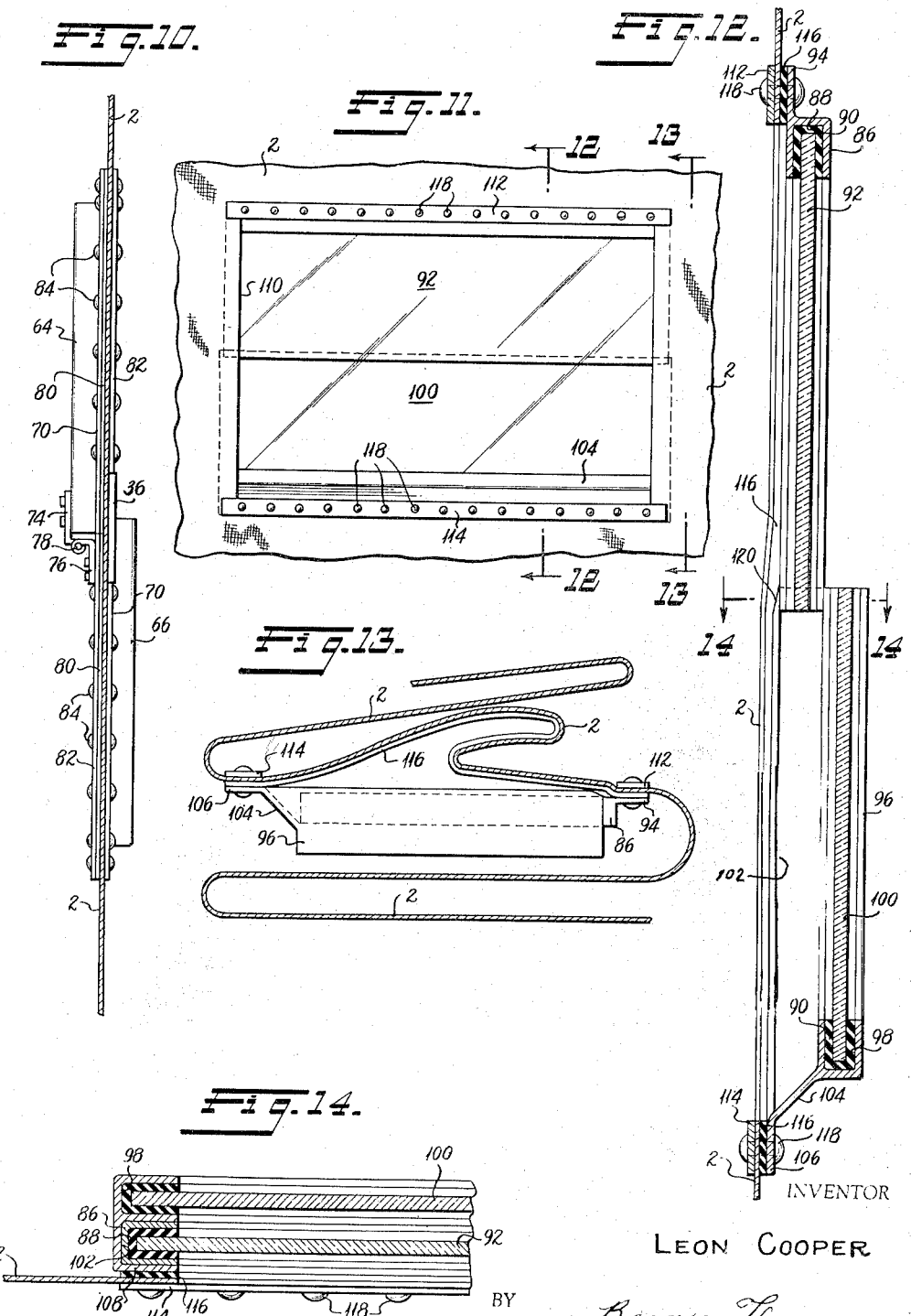

United States Patent Office 2,785,004
Patented Mar. 12, 1957

2,785,004

COLLAPSIBLE WINDOW FOR FLEXIBLE PANELS

Leon Cooper, Miami Beach, Fla.

Application October 14, 1954, Serial No. 462,268

10 Claims. (Cl. 296—145)

This invention relates to collapsible windows for flexible panels, and particularly to windows for use in flexible panels of canvas or other fabric which are occasionally folded for storage in a relatively narrow space. The invention finds particular use in rear windows for convertible automobile tops. Rear windows of glass for convertible tops have heretofore necessarily been of rather limited height so that the rear panel in which they are mounted can be folded to occupy a relatively small narrow space when the top is down. It is, of course, desirable that the rear windows in such installations be of glass, which in itself is not flexible and the windows have, therefore, been made of relatively small dimensions. Attempts have been made to provide larger window areas by hinging the frames of two framed panes together but such constructions are not satisfactory since the frame portions along the hinge line constitute serious obstructions to clear vision. It has also been proposed to make foldable windows for convertible automobile tops wherein upper and lower panels of glass were joined by a transparent or substantially transparent, flexible portion of plastic or the like. Such constructions have not proven satisfactory since continued folding and bending of the plastic material results in its early destruction.

According to the present invention, a collapsible window for such flexible panels is provided wherein two separate panels of glass constitute the window pane. Such panels are mounted in a frame which is collapsible to substantially one-half its "open" height. The frame consists of two generally U-shaped frame members joined for relative movement to an open position wherein the ends of the legs of the U-shaped frames are adjacent each other and the frames thus define a window opening without opaque transverse or cross bars extending across that opening. Each U-shaped frame member carries a rigid glass panel so mounted therein that when the frame is in its open position opposite faces of the two glass panels, respectively, are in overlapping relation to shed water and render the window substantially weatherproof.

In one form the frame members are hinged together at the ends of the legs of the U-shaped members, whereas in another form the two U-shaped frame members are telescopically related. In each instance, however, the frame members are movable to a collapsible condition wherein they overlie each other and thus define a rigid structure of about one-half the height of the window thereby permitting folding of the flexible panel in which the frame is mounted into a compact and narrow space, as is necessary in convertible automobile tops.

The invention further includes features wherein the relative movement between the frame members does not result in stretching or undue stresses being applied to the flexible panel, portions of which are free of attachment to the frame, as will be hereinafter described.

It is therefore an object of this invention to provide a collapsible glass window for flexible panels and means resulting in a weather-tight seal around the window when in its extended position.

Another object of this invention is to provide a collapsible window having relatively movable panes and wherein the entire window is transparent when in its extended position.

Still another object of this invention is to provide a collapsible window having non-flexible panes, the panes having free adjacent edges whereby the window may be folded or collapsed without folding or hinging the panes directly to each other.

A further object of this invention is to provide a collapsible window for flexible panels wherein ventilation through the window is permitted, while in its extended position, while rain is not permitted to enter.

A still further object of this invention is to provide a collapsible window for a flexible panel wherein portions of the panel are free of attachment to the window frame and separately foldable but wherein such portions are maintained taut and held in sealed relation against the window frame when in extended position.

Additional and further objects and advantages will become apparent to those skilled in the art as the description proceeds in connection with the accompanying drawings, wherein:

Fig. 1 is a rear elevational view of one form of window constructed in accordance with the present invention and showing a portion of the flexible panel in which the window is mounted;

Fig. 2 is a vertical sectional view, on an enlarged scale, taken substantially along the line 2—2 of Fig. 1;

Fig. 3 is a sectional view, on an enlarged scale, taken substantially along the line 3—3 of Fig. 1, but showing the window and flexible panel in folded or collapsed condition;

Fig. 4 is a fragmentary rear elevational view of a different form, similar to Fig. 1, but showing a modified form of hinged connection between the frame members;

Fig. 5 is a vertical sectional view taken substantially along the line 5—5 of Fig. 4;

Fig. 6 is a sectional view of the modification of Fig. 4 taken substantially along the line 5—5 of Fig. 4 but showing the entire frame and flexible panel in folded or collapsed condition;

Fig. 7 is a rear elevational view, similar to Fig. 1, but showing a different form of the invention;

Fig. 8 is a vertical sectional view, on an enlarged scale, taken substantially along the line 8—8 of Fig. 7;

Fig. 9 is a sectional view of the form of Fig. 7 taken substantially along the line 10—10 of Fig. 7, on an enlarged scale, but showing the window and flexible panel in folded or collapsed position;

Fig. 10 is a sectional view taken along the line 10—10 of Fig. 7, showing the frames in extended or open position;

Fig. 11 is a rear elevational view of a still further form of the invention;

Fig. 12 is a vertical sectional view taken substantially along the line 12—12 of Fig. 11 but on an enlarged scale;

Fig. 13 is an enlarged sectional view taken substantially along the line 13—13 of Fig. 11 but showing the window in collapsed condition and the flexible panel in folded condition;

Fig. 14 is a fragmentary sectional view taken along the line 14—14 of Fig. 12; and Fig. 15 is a fragmentary perspective view, on an enlarged scale, of one of the hinges and related elements of the form of the invention shown in Fig. 1.

Referring first to the form shown in Fig. 1, a flexible panel 2 which may be of canvas, waterproof fabric or the like, is provided with an opening complementary in size and shape to the outline of a window frame indicated generally at 4. The window frame 4 comprises an upper frame member having a transverse portion 6 and depending legs 7 arranged generally in the shape of an inverted U. The lower frame member is similarly of U-shape, having a transverse member 8 and upwardly extending legs 10. The frame members may be formed of folded sheet metal or may be constructed in any other desired manner and are of generally S-shape in section as clearly shown in Fig. 2. The frame members thus define inwardly facing channels 12 of a width and depth to receive and hold a rubberlike seal 14 embracing the edges of a glass pane 16. The frame members also define outwardly facing channels 18 having a rubberlike seal 20 therein and receiving the edges of the flexible panel 2 defining the periphery of the frame-receiving opening therein. Rivets or other suitable fastening means 22 are provided to securely fasten the edges of the panel 2 in the channel 18 and in sealing relation to the material 20 and the frame periphery.

In this form of the invention the frames are so arranged that when in their extended positions the channels 12 are coplanar and those portions of the channels in the legs 7 and 10 are in direct alignment with each other whereby the panes 16 and 24 are also coplanar.

The frame legs 7 and 10 are respectively provided with ears 26 and 28, welded or otherwise rigidly secured to the inner wall 29 of channels 18 and arranged in overlapping relation, the outer walls 31 of the channels 18 being cut away or notched, as shown at 33 (see Fig. 15). The ears on adjacent legs 7 and 10 are pivotally joined by means of a pivot pin 30 whereby the frame members are pivotally joined for swinging movement about the axis defined by pins 30.

As shown in Fig. 2, the legs 7 and 10 of the frame members terminate in complementary beveled end surfaces 32 and the adjacent edges of the panes 16 and 24 are likewise beveled. By this arrangement, as is evident from Fig. 2, the outer surface of the upper pane 16 overlaps the inner surface of the lower pane 24 and thus prevents rain water from entering between the panes. In use, the window extends in a generally vertical direction, although it may be and generally is sloped forwardly at the top, and the hinge axis 30 is on the outside of the window. Thus, the outer surface of the upper pane will carry rain water or the like to a position below the upper edge of the inner surface of the lower pane and render the window weatherproof. As is also apparent, when the window is in extended position, the entire window opening is transparent since the panes 16 and 24 are transparent and their adjacent edges are free of frame members. The beveled joint between the panes is substantially transparent and thus does not constitute an obstruction to vision.

Portions of the periphery of the opening in flexible panel 2 adjacent the hinges and below the cut-away portions 33 between the frame members is left free of attachment to the window frames. The flexible panel 2 and sealing material 20 are slotted as at 34 (Fig. 15), to permit the ears 26 and 28 to project therethrough. The fabric 2 and sealing material 20 are free of attachment to the frames in the region underlying the cut-outs 33 but are secured to each other by a suitable cement or the like. Thus, when the frame members are unfolded to extended position as shown in Fig. 1, the panel 2 is held taut with the sealing material 20 below the cut-outs 33 being pressed against wall 29 of the frame to seal the panel against the frame in the region of the hinges. The slots 34 in panel 2 and sealing material 20 are provided for the purpose of permitting the frame members to fold to the position of Fig. 3 without tearing or unduly stretching the flexible panel 2 in the region of the hinges.

Fig. 2 shows that when the frame members are in extended position the plane of the panel 2 is laterally offset from the axis of pin 30 by a small amount, whereas in folded position shown in Fig. 3, the fabric and material 2 can extend from the leg 10 to the leg 7 along a shortened path without tearing the panel in that region, the slots 34 permitting the unsecured portion of the panel 2 to pass over ears 26 and 28. Preferably, the pin 30 is as near as possible to the plane of panel 2 when the parts are in the position of Fig. 2.

The form of the invention shown in Figs. 4 to 6 is similar to that shown in Figs. 1 to 3, except that the frame members 38 and 40 are not directly hinged together along a fixed axis but are pivotally joined by means of a link 42 extending across the ends of adjacent frame legs at the outer edges thereof and pivoted, as at 44 and 46, to the frame members 38 and 40, respectively. The legs of frame members 38 and 40 are provided with abutments or stop members 48 and 50, respectively, engageable with the sides of corresponding links 42 when the frames are in extended position to limit relative pivotal movement of the frames to one side of their extended positions. Thus, referring to Fig. 5, the frame member 38 can be swung relative to frame member 40 only by swinging it to the left as seen in that figure.

In this form the flexible panel 2 is free of securement to the frame members in the region of the hinges, the outer wall of the fabric-receiving channel being cut away on opposite sides of the hinge, as shown at 52 in Fig. 4. The portion of the fabric 2 below the cut-out is secured, such as by cement, or the like, to the underlying seal material which in turn is free of the frame. The cut-outs 52 of Fig. 4 are for the same purpose and function in the same way as the corresponding features of Fig. 1. The frame members of this form are also of U-shape as described in connection with Fig. 1 and adjacent ends of the legs thereof are beveled as at 32. Each frame member is also provided with upper and lower panes 16 and 24, the same as described in connection with Figs. 1 and 2.

Fig. 6 shows the form of Fig. 4 in folded or collapsed condition. When the frame members are collapsed to the folded position of Fig. 6, the portions of panel 2 underlying cut-outs 52 being free of attachment to the frames may fold separately from the rest of the flexible panel which is attached to the frames, as indicated at 62 in Fig. 6. Obviously, the panel could not be secured throughout its entire edge portion to the frames 38 and 40 without tearing the panel when the frames are folded as shown in Fig. 6. By leaving a portion of the panel, in the region of the hinges, free of securement to the frames, those portions can assume the position of Fig. 6 without tearing and yet permit the frames to fold freely as shown. When the frames are in their extended position, the panel 2 is held taut and the sealing strip 20 presses tightly against the surface of the inner wall of the fabric-receiving channel to render the window weatherproof. In this form the links 42 and pivots 44 and 46 are inside the flexible panel 2 and thus protected from the weather.

In the form shown in Figs. 7 to 9, the window frame comprises a pair of generally U-shaped frame members 64 and 66 but these frame members are of different sectional shape than those heretofore described. In this embodiment the frame members define inwardly facing channels 68 and are provided with an integral outwardly extending flange 70 substantially coplanar with one side of the channel. The inwardly facing channels 68 receive a sealing member 20' embracing the edges of glass panes 72. The downwardly directed legs of the frame member 64 are each provided with a bracket 74 fixed on the outer face thereof and cooperating with a bracket 76 on the outer face of the adjacent leg of the lower frame member 66 to define a hinge having an axis at 78. In this form of the invention the frame members are so arranged that the flange 70 of the upper frame member is adjacent the flange 70 of the lower frame member, thus positioning the frame members in offset relation with the upper frame member outermost. Thus, the axis 78 of the hinges is closely adjacent the plane of the upper glass pane 72 but is laterally offset rearwardly from the lower glass pane 72 by a substantial distance. The frame members are so constructed and positioned relative to the hinge structure that they overlap somewhat, as clearly shown in Fig. 8. Thus, the upper pane 72 extends downwardly a substantial distance below the upper edge of pane 72' in the lower frame member. By this construction rain water or the like is conducted by the outer surface of the upper pane member to a position well below the upper edge of the lower pane member and the window is thus provided with ventilating means much like a "louvre" since the upper and lower glass panes are spaced apart a substantial distance. This window permits ventilation of the interior of the automobile while efficiently shedding rain water and the entire window area is fully transparent since no frame members extend across the window opening.

The flexible panel 2 extends about the frame of this form and is secured to the inner face of the flange 70 of frame member 64 and to the outer face of the flange 70 on the lower frame member. Thus, the flexible panel lies in substantially a single plane without deviation therefrom when the window is in extended position. Sealing strips 80 of rubber or the like are positioned over the edge of the flexible panel 2 and clamping strips 82 are held by rivets 84 in clamping relation to the panel 2, sealing means 80 and flanges 70 to firmly secure the periphery of the opening in sealed relation to the flanges 70. In this form the panel 2 is notched, as at 34, and provided with sealing means 36 of rubber or the like secured to the panel and filling the notch 34 to the outer edge of the frame members. The edge of means 36 near the frame is free of attachment thereto to permit the assembly to fold to the position of Fig. 9 without tearing the material of the flexible panel in the region of the hinges and to insure a weather-tight window in extended position.

In the form of Figs. 11 to 14, the frame members are also generally U-shaped in outline but are not hingedly joined as in the previous modifications. The upper frame member 86 is of sectional shape similar to that of the frame members of Fig. 8, having an inwardly facing channel 88 receiving the sealing means 90 and upper pane 92 but only the upper cross member is provided with the outwardly directed flange 94. The downwardly directed legs of the upper frame member are of channel shape only, without the outwardly directed flange 94. The lower frame member 96 defines an inwardly facing channel 98 receiving sealing means 90 and a lower glass pane 100. The upwardly directed legs of the lower frame member are provided with a further inwardly facing channel 102 (see Fig. 14) of a size and shape to slidably receive the downwardly extending legs of the upper frame member 86 in spaced relation to the lower pane 100. The bottom transverse member of the lower frame member 96 is provided with a downwardly and outwardly directed flange 104 which extends outwardly to the outer edge of the channels 102 and which terminates in a downwardly directed flange 106 substantially coplanar with the outer flange 108 of channels 102. In this form of the invention the upper frame member 86 may slide from its extended position (shown in Fig. 12) downwardly in the channels 102 to the collapsed position shown in Fig. 13 wherein the panes 92 and 100 overlie each other in spaced relation. In this form also the panes in the upper and lower frame members are laterally spaced and are in overlapping relation when the window is extended to shed rain water while providing ventilation through the window without obstructing vision therethrough. Since the window in its extended position is arranged generally vertically, rain water falling on the panes drains downwardly thereover to the flange 104 which itself slopes downwardly and outwardly to direct the rain water to the outer surface of the flexible panel 2.

The flexible panel 2 is provided with an opening 110 (Fig. 11), the peripheral edges of which, at the top and bottom of the opening, are clamped respectively to the flanges 94 and 106 by means of overlying clamp bars 112 and 114 and are sealed to their respective flanges by sealing means 116. Rivets 118 serve to clamp the frames to the flexible panel. The vertical side portions of the flexible panel 2 defining the window opening 110 overlie the outer faces of the frame members 86 and 96 while being free of all securement thereto. The sealing means 116 extends around the entire periphery of the window and the portions thereof underlying the unsecured vertical edges of the window opening are cemented or otherwise secured to the edges of the flexible panel 2 but not to the frame members. Thus, when the window is in its extended position as shown in Fig. 12 the vertical edge portions of the flexible panel are drawn taut and firmly press the vertical portions of the sealing means 116 into sealing engagement with the outer surfaces of the frame members to render the window weather-tight. The uppermost edges of the outer flange 108 of channels 102 are beveled as shown at 120 (Fig. 12) to permit the sealing means 116 to snugly engage the entire outer surface of the frame members in sealing relation. Furthermore, the sealing means 116 may be molded or shaped as indicated in Fig. 12 to more snugly complement the shape of the outer surface of the frames when the window is in extended position.

Fig. 13 shows this form of the invention in collapsed position and illustrates how the window can collapse to about half its vertical dimension while the flexible panel between the upper and lower edges of the window can flex and fold independently of the window frame so that the flexible panel and frame may be folded to occupy a relatively small space.

In the forms of Figs. 8 and 12 the glass panes are separated at their overlapping edges and provide for ventilation, as described. However, if ventilation through the window is not desired, a strip of transparent plastic or other material may be cemented to the edge portion of one of the glass panes to fill the space and thus prevent air flow through the window without obstructing vision therethrough.

In those forms employing hinged frame members, suitable springs may be mounted at the hinge axes to insure folding of the window frames as the fabric panel 2 is first loosened at the start of lowering the convertible top. No such springs are shown in the drawings since they may take many forms already known to those skilled in the art.

While a limited number of specific embodiments of this invention have been shown and described herein, it is to be understood that these embodiments are merely illustrative of the invention and not limiting. The invention may take other forms falling within the scope of the appended claims.

I claim:

1. In a folding window for the folding top of a convertible vehicle body; a pair of generally U-shaped substantially rigid frame members, means joining the legs of said frame members for relative movement from an extended position wherein the legs of said members are in generally end-to-end relation to define a closed frame to a collapsed position wherein said legs are in superimposed relation throughout substantially the entire length of the legs of at least one of said frame members, a transparent pane in each of said frame members, each of said panes having a free edge extending between the ends of the legs of its corresponding frame member, said panes being so arranged that when said frames are in said extended position free edge portions of said panes are in overlapping relation, a flexible panel having an opening therein corresponding in size and shape to the outline of said window when said frames are in said extended position, means securing all peripheral portions of said frames, except those portions adjacent the ends of said legs, to said panel at the periphery of said opening, said means joining said legs being laterally offset from the plane of said flexible panel when said frames are in said extended position.

2. A window construction as defined in claim 1 wherein said unsecured panel edge portions have sealing means thereon engageable in sealing relation with said portions of said legs adjacent said ends when said frames are in extended position.

3. A window construction as defined in claim 1 wherein said frame members include inwardly facing channels embracing edge portions of said transparent panes, sealing means between said panes and said channels, and outwardly directed flanges on said frame members, said secured portions of said panel at the periphery of said opening being secured to said flanges in sealing relation thereto.

4. In a folding window for the folding top of a convertible vehicle body; a pair of substantially rigid frame members defining a window opening, means pivotally joining said frame members for relative pivotal movement from an extended position wherein said members lie generally in the same plane to a folded position wherein one member overlies the other, a transparent pane in each of said frame members, each of said panes having a free edge extending across said window opening with said free edges being generally parallel to and adjacent each other and the pivot axis, said panes being so arranged that when said frame members are in said extended position free edge portions of said panes are in overlapping relation, a flexible panel having an opening therein corresponding in size and shape to the outline of said window when said frames are in said extended position, means securing all peripheral portions of said frames, except those portions adjacent the ends of said legs, to said panel at the periphery of said opening, said pivotal joining means being laterally offset from the plane of said flexible panel when said frames are in said extended position.

5. A window construction as defined in claim 4 wherein said panes lie in the same plane when said frames are in said extended position and wherein said free edges of said panes are oppositely bevelled and in abutment with each other.

6. A window construction as defined in claim 4 wherein said means pivotally joining said frame members comprise links, the ends of each of said links being pivoted to adjacent outer edge portions of said frame members.

7. A window construction as defined in claim 6 wherein each adjacent portion of said frame members is provided with stop means cooperating with said links to limit relative pivotal movement of said frame members to a single direction from said extended position to said folded position.

8. A window construction as defined in claim 4 wherein said means pivotally joining said frame members comprise links, the ends of each of said links being pivoted to adjacent outer edge portions of said frame members, portions of said panel, adjacent said links, extending over the outer faces of the adjacent portions of said frame members to overlie and cover said links and the juncture between said frame members.

9. A window construction as defined in claim 4 wherein said panes lie in spaced parallel planes when said frame members are in extended position.

10. A window construction as defined in claim 9 wherein the free edges of said panes are in spaced apart overlapping relation when said frame members are in extended position whereby to provide ventilation through said window.

References Cited in the file of this patent

UNITED STATES PATENTS

| | | |
|---|---|---|
| 988,448 | Earl | Apr. 4, 1911 |
| 1,302,500 | Blomberg | May 6, 1919 |
| 1,610,036 | Buxbaum | Dec. 7, 1927 |
| 2,560,493 | Spring | July 10, 1951 |
| 2,613,405 | Moseley | Oct. 14, 1952 |
| 2,638,379 | Spring | May 12, 1953 |